Figure 1:
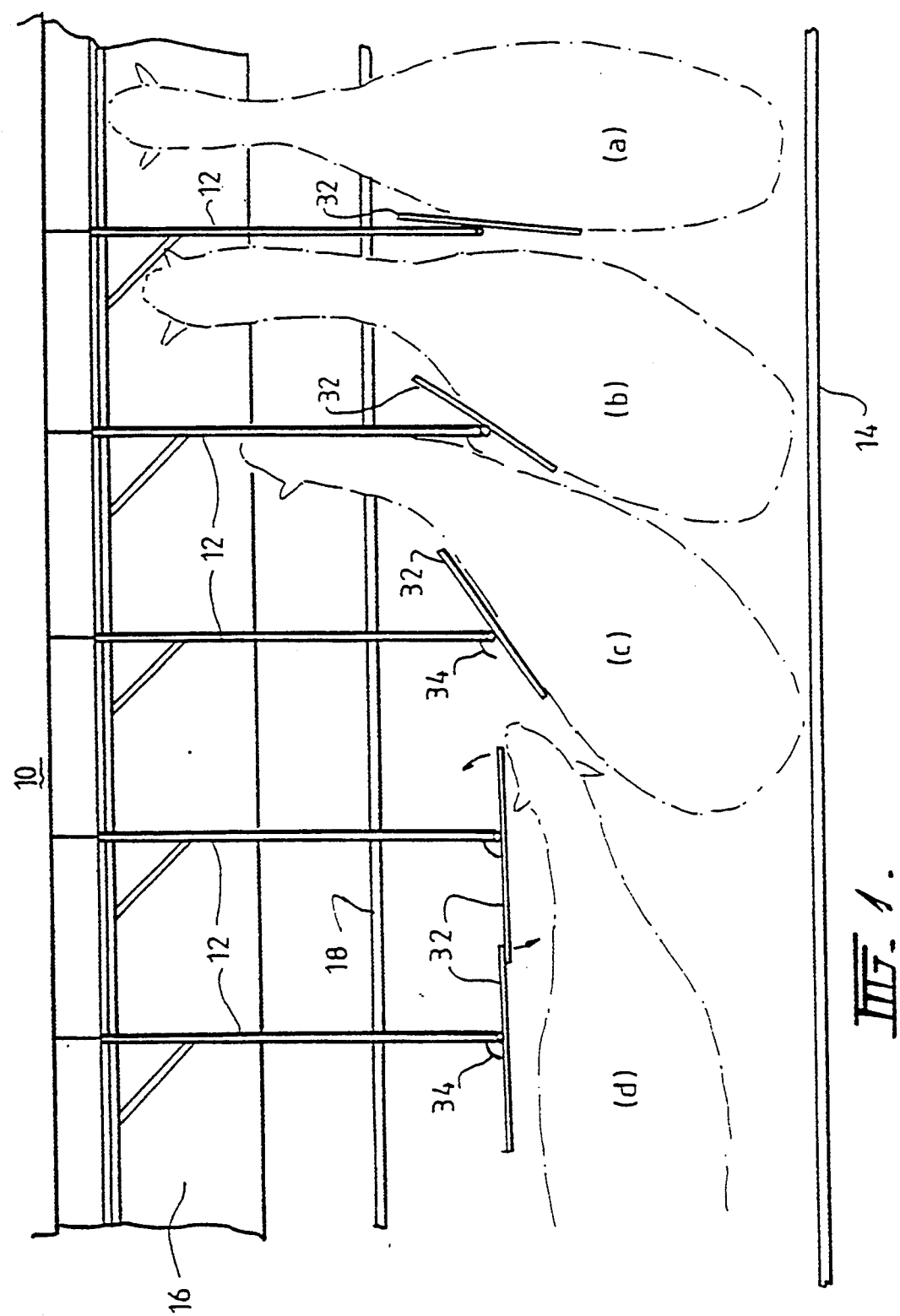

United States Patent [19]

Larsen et al.

[11] Patent Number: 5,423,289
[45] Date of Patent: Jun. 13, 1995

[54] GATE ASSEMBLY FOR MILKING SHED

[76] Inventors: Owen M. Larsen; Janet R. Larsen, both of RMB 1665, Tallangatta, Victoria 3700, Australia

[21] Appl. No.: 175,435
[22] PCT Filed: Jul. 9, 1992
[86] PCT No.: PCT/AU92/00335
  § 371 Date: Mar. 4, 1994
  § 102(e) Date: Mar. 4, 1994
[87] PCT Pub. No.: WO93/00798
  PCT Pub. Date: Jan. 21, 1993

[30] Foreign Application Priority Data

Jul. 9, 1991 [AU] Australia .............. PK7110
Aug. 30, 1991 [AU] Australia .............. PK8051

[51] Int. Cl.⁶ ................... A01K 1/12; A01K 1/00
[52] U.S. Cl. .................... 119/27; 119/14.03
[58] Field of Search ................ 119/14.03, 27

[56] References Cited

U.S. PATENT DOCUMENTS

| | | | |
|---|---|---|---|
| 3,734,059 | 5/1973 | Rodrigues | 119/27 |
| 4,362,127 | 12/1982 | Nielsen et al. | 119/14.03 |
| 4,977,856 | 12/1990 | Norwood | 119/14.03 |
| 5,000,119 | 3/1991 | Moreau et al. | 119/14.03 |

FOREIGN PATENT DOCUMENTS

| | | |
|---|---|---|
| 534372 | 8/1980 | Australia . |
| 547204 | 3/1984 | Australia . |
| 559348 | 8/1984 | Australia . |
| 1137436 | 12/1982 | Canada . |
| 350558 | 1/1990 | European Pat. Off. . |
| 447822 | 9/1991 | European Pat. Off. ............ 119/27 |
| 2015104 | 10/1971 | Germany . |
| 3113752 | 2/1982 | Germany . |
| 2016888 | 10/1979 | United Kingdom . |

*Primary Examiner*—Robert P. Swiatek
*Attorney, Agent, or Firm*—Lorusso & Loud

[57] ABSTRACT

A mechanism for the control of cows within a milking shed that includes a plurality of dividers mounted so as to be movable from a first or raised position, whereupon cows can move beneath the dividers, to a second or lower position where the dividers are capable of preventing movement by the cows. The dividers are spaced apart so as to provide a plurality of milking stalls. Each of the dividers has an outer end, an inner end, an upper rail, a lower rail, and a plurality of vertical rails connecting the upper rail to the lower rail. Each outer end has pivotally mounted thereto an end gate pivotable between a transverse position and a position approximately co-planar with the dividers by movement of a cow into the stall immediately past the divider. Each divider is pivotally mounted to a milking shed wall and the lower rail is inclined upwardly at the inner end of each divider and joins the upper rail at the wall pivotal mounting.

9 Claims, 4 Drawing Sheets

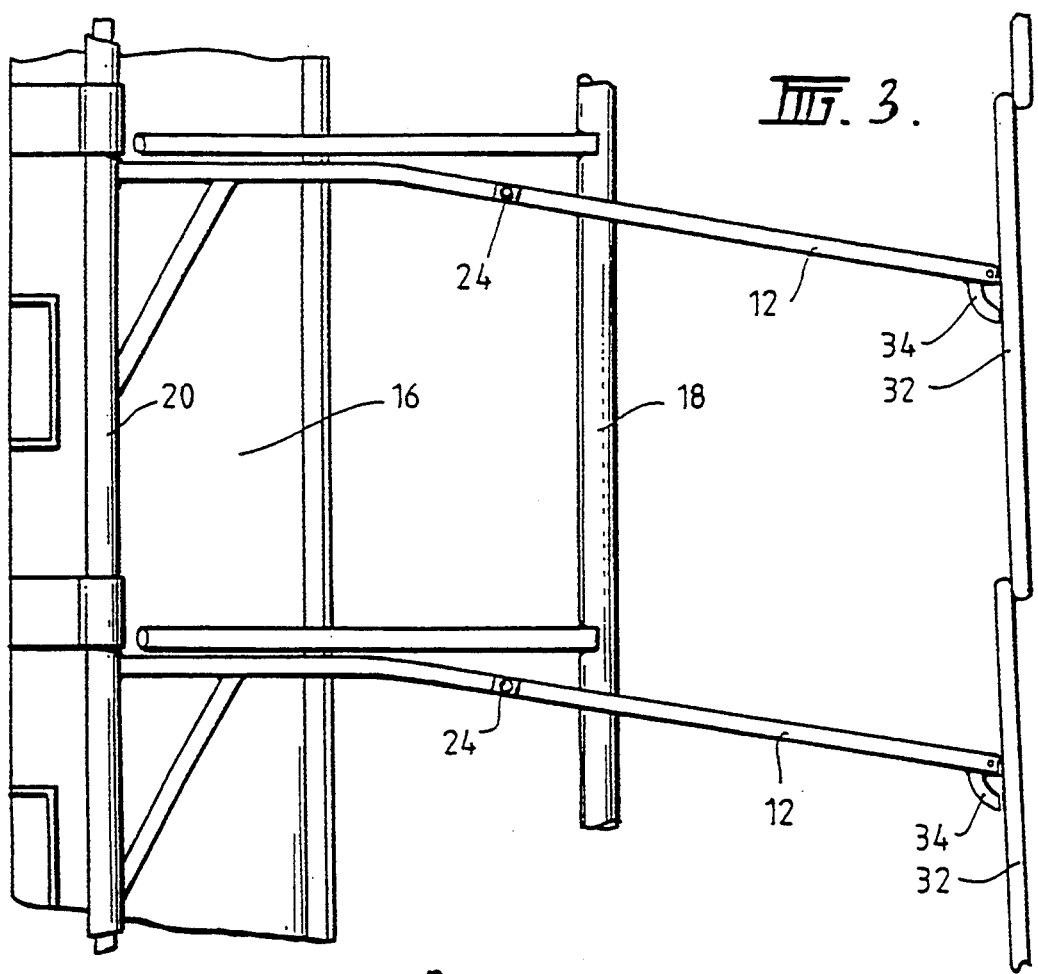
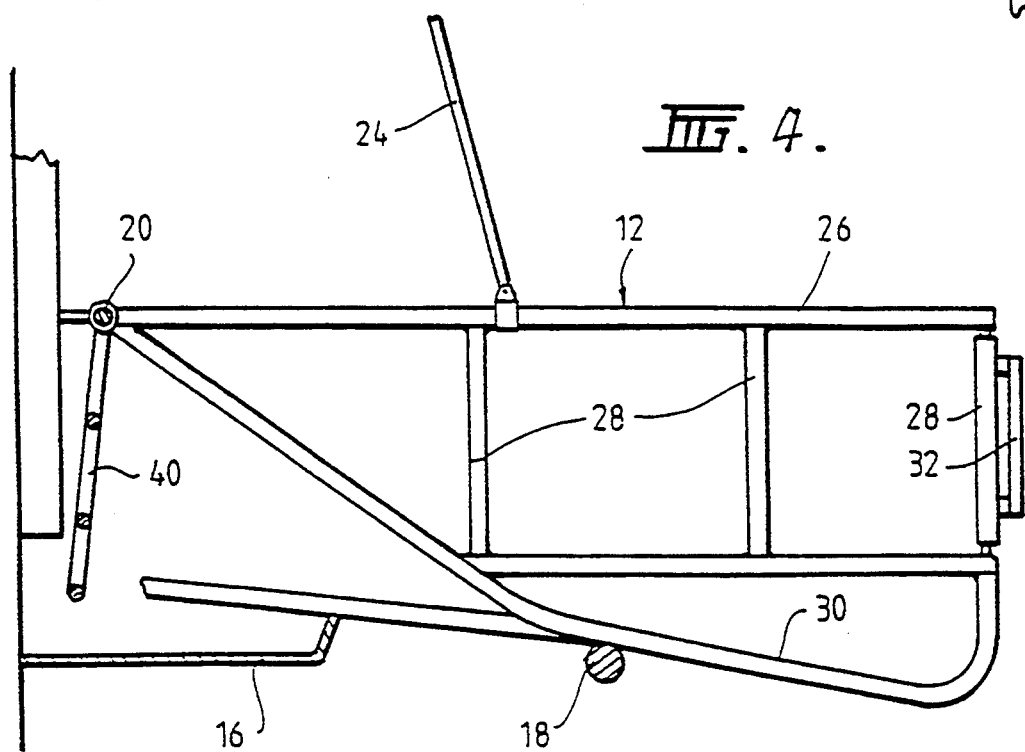

GATE ASSEMBLY FOR MILKING SHED

This invention relates to milking sheds and refers particularly, though not exclusively, to mechanisms for controlling the movement of cows in milking sheds.

In our early Australian Patents Nos. 547204, 534372 and 559348, there are described and illustrated various gates and the like for the controlling of access to and departure from milking sheds by cows. It is most desired to control the access to and departure from the milking shed by the cows so that the dairy farmer can more easily control their movement so that he is able to control the rate of access and therefore his speed of work. However, there is no known mechanism for the controlling of the cows within the shed. This can cause certain problems.

Some cows are more timid than others, and others more aggressive. This is relevant because the more aggressive cows attempt to bully past the more timid cows to arrive at a milking stall at the earliest possible opportunity so they can have a greater share of the feed waiting there. If not controlled, this can cause a reduction in the milk obtained from the cows, and a significant increase in the excreta which no doubt passes on to the milking shed floor. This increases the work for the farmer as well as his costs for a lower return.

It is therefore the principal object of the present invention to provide a mechanism for controlling the movement of cows within a milking shed.

For the above and other objects in mind, the present invention provides a mechanism for the control of cows within a milking shed, said mechanism including a plurality of dividers mounted so as to be movable from a first or raised position whereupon cows can move beneath said dividers, to a second or lower position where said dividers are capable of preventing movement by said cows; said dividers being spaced apart so as to provide milking stalls for said cows; each of said dividers having an outer end, each outer end having pivotally mounted thereto an end gate pivotable between said transverse position and a position approximately co-planar with said dividers by movement of a cow into said stall immediately past said divider.

Figure 2:
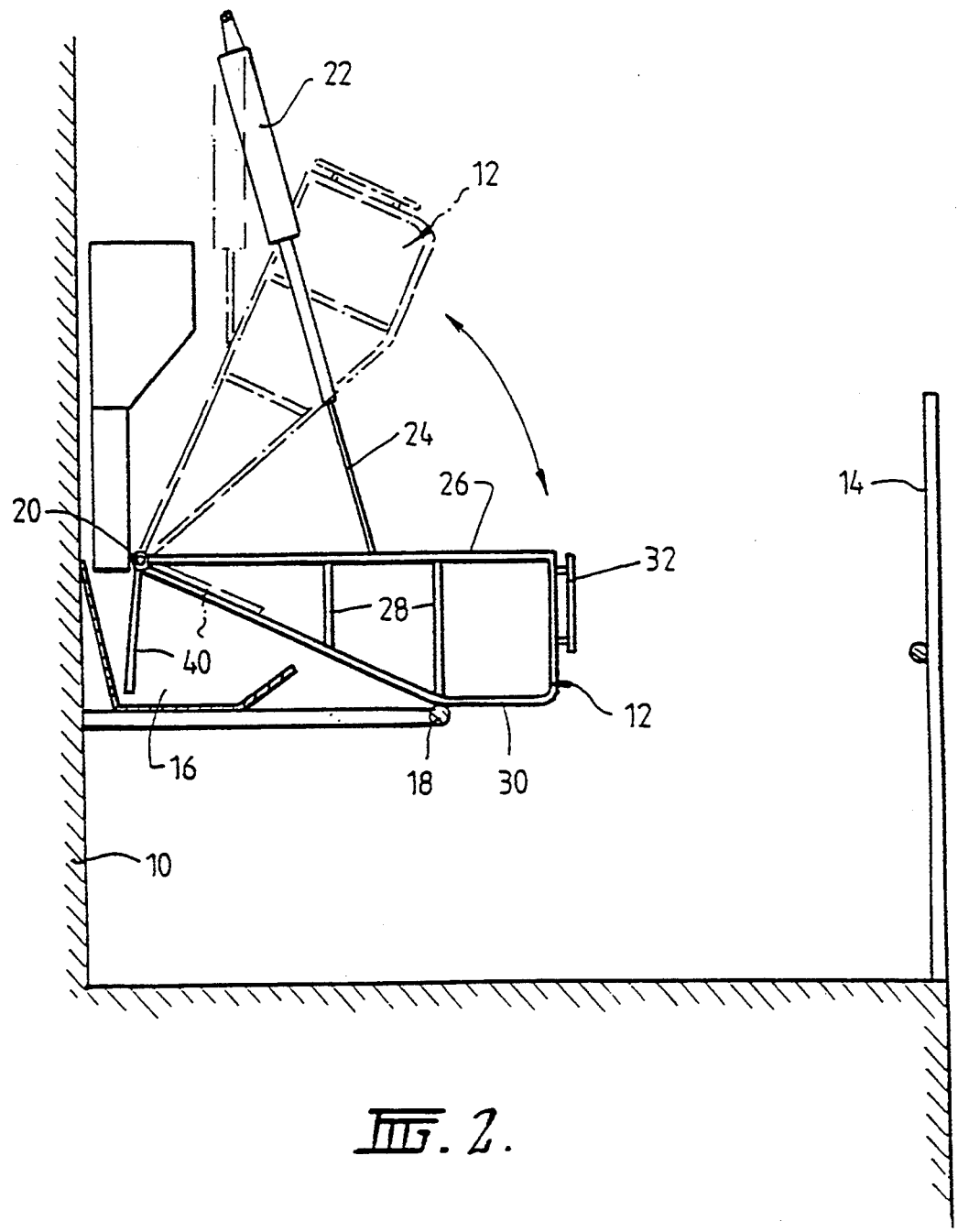
Figure 5:
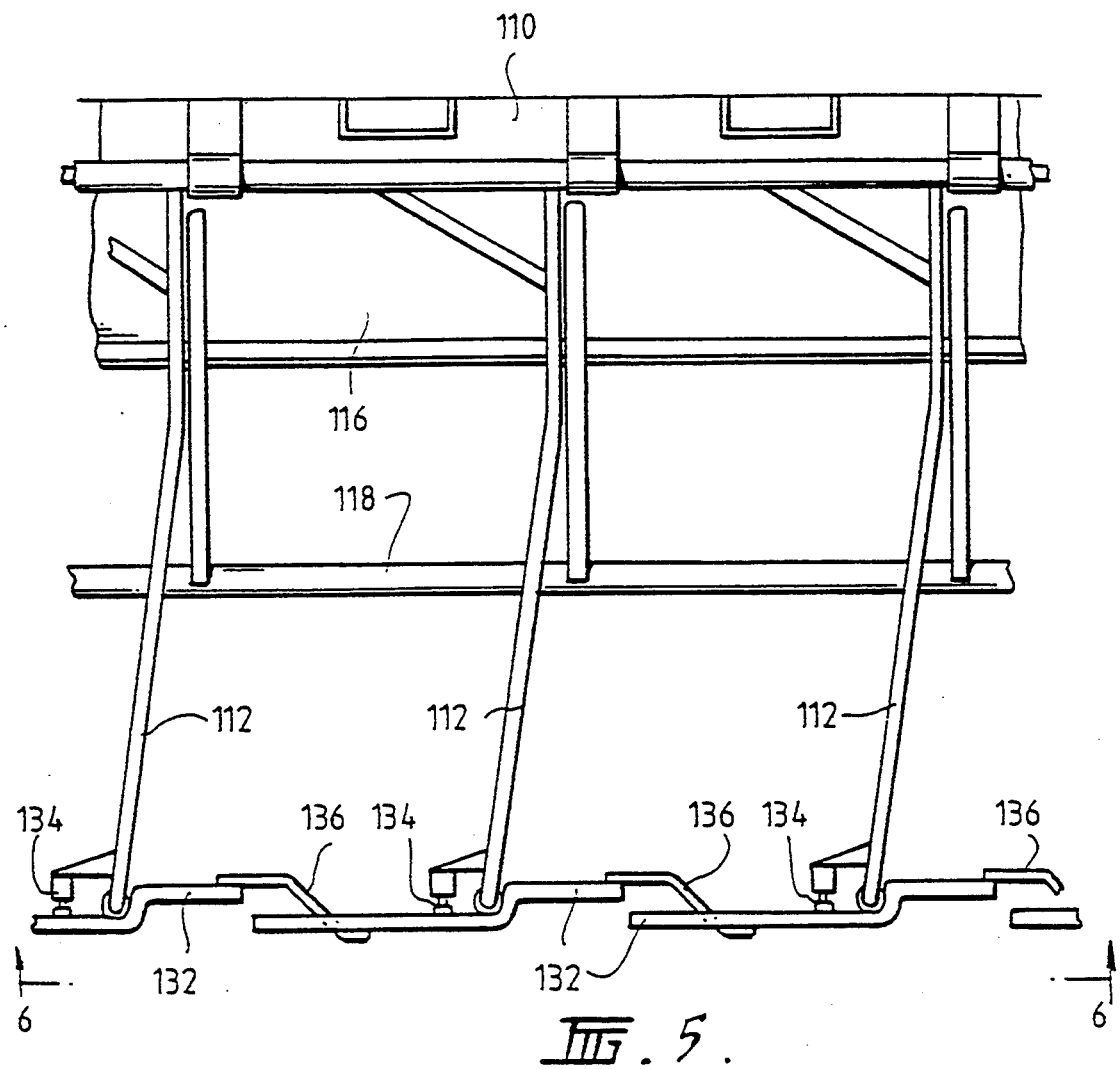
Figure 6:
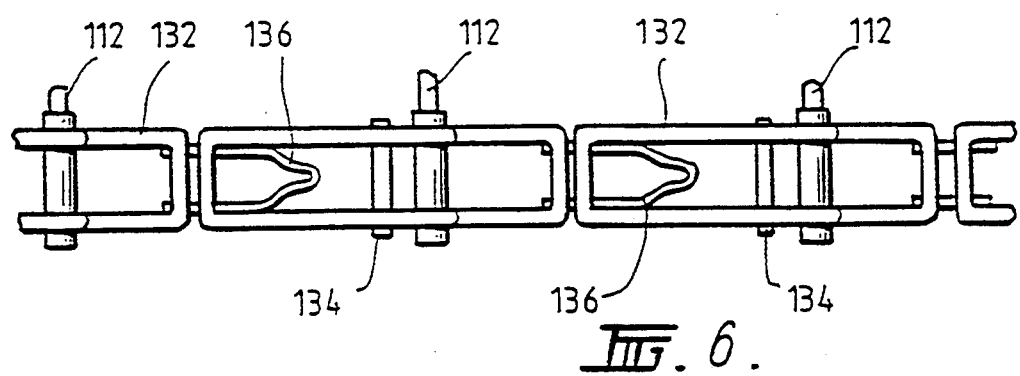

In order that the invention may be clearly understood there shall now be described by way of non-limitative example only and preferred construction of a milking shed incorporating the principal features of the present invention. The description is with reference to the accompanying illustrative drawings in which:

1. FIG. 1 is a plan view of part of a milking shed incorporating the present invention;
2. FIG. 2 is an end view of the milking shed of FIG. 1 (without the cows) showing the dividers in the first and second positions;
3. FIG. 3 is an enlarged plan view of one section of the milking shed of FIG. 1 (without the cows);
4. FIG. 4 is an enlarged end view corresponding to that of FIG. 2;
5. FIG. 5 is a view corresponding to that of FIG. 3 but showing a modified form; and
6. FIG. 6 is a front view of the form of FIG. 5 along the lines and in the directions of arrows 6-6 of FIG. 5.

To refer firstly to the embodiment of FIGS. 1 to 4 there is shown a milking shed in which a number of cows are desired to be located so as to be milked. Access to the milking shed would be as desired but preferably in accordance with one of our earlier mentioned Australian Patents.

The milking shed has a wall 10 to which is mounted all of the control mechanisms, including the dividers 12. Although most milking sheds are designed as double sheds—being a row on each of the opposite walls—it is preferable that a control rail 14 be used so that the distance from the wall 10 to the control rail 14 is only marginally greater than the length of a normal cow.

Naturally there is provided a feed trough 16 mounted to the wall 10, and a brisket rail 18 also attached to the wall 10. These are in accordance with normal constructions and are known.

The dividers 12 are mounted to the wall 10 by virtue of a hinged connection 20 and are operated by a vacuum ram 22 acting through a rod 24 pivotally attached to the upper rail 26 of each divider 12. Naturally a vacuum ram 22 may be provided for each divider 12, or they may be operated in sets. This would depend very much upon the requirements of the individual milking shed or the farmer concerned.

Each divider 12 has the upper rail 26 and depending therefrom a plurality of vertical rails 28 connecting to a lower rail 30. The sizing of the dividers 12 is such as to make it clear that when in the lower position (see FIGS. 2 and 4) the divider 12 will prevent movement by a cow other than through the gap between the end of the gate 12 and the rail 14.

As is clearly illustrated in FIG. 2, the gate is movable between a second or lower position and a first or raised position. When in the raised position, it is clear that a cow can pass under the divider 12 to continue movement through the milking shed.

At the end of each divider 12 is mounted an end gate 32. The end gate 32 is pivotally mounted so that it can move from its transverse position as shown in FIG. 1 at the left end to an almost coplanar position as is shown in the right end of FIG. 1. A small stop 34 is provided on each divider 12 to prevent the end gate 32 from moving past the transverse position. In other words, it is movable only from that position as shown on the left of FIG. 1 to that position shown at the right of FIG. 1.

The nature of these end gates 32 is clearly shown in FIG. 3 in that they are in an overlapping relationship.

The operation of the system is that if one considers FIG. 1 to be the end of the milking shed, the cow marked (a) will proceed into the milking shed from the left and enter the first stall. The first stall will have a divider 12 on its left but not on its right—the positioning of the cow being controlled by an exit gate in accordance with one of our earlier mentioned patents. In entering the first stall, the left flank of the cow will press against the end gate 32 and move it to the position shown. This therefore means that access to the second stall is therefore possible as the substantial part of the stall is available to the cow (b). Also, the end gate 32 protects the flank of cow (a). Cow (b) would therefore enter the second stall thus moving the end gate 32. This would allow cow (c) to gain access to the third stall, and cow (d) to gain access to the fourth stall. Naturally, all of the dividers 12 would be in the lowered position at this time. Once the cows are in position—and this may be for the entire side or for only part of the side—feed is released into the feed trough 16. The normal procedures resulting in milking can therefore commence.

By adopting this procedure, the cows can only proceed along the milking shed in single file. It only takes the lead cow to be trained to go into the first feeding stall for the entire system to work. There can be no jostling for position or the like due to the single file proceeding. It is advantageous that the cows be introduced in batches and that the stalls—particularly the dividers 12—be operated in sets so that the number of milking stalls operated by a single vacuum ram or a number of vacuum rams working simultaneously, is equal to the number of cows. This makes it far easier for the farmer. However, they can be individually controlled if desired.

Once the normal milking operation has been concluded, the exit gate can be raised. The cow (a) would therefore leave the milking shed. At this time the vacuum ram can be operated to raise or attempt to raise the dividers 12. As the end gate 32 is pressing against the side of cow (a), the divider 12 will not raise until the cow (a) moves to leave the milking shed. This would therefore allow the divider 12 between cows (a) and (b) to lift. This would therefore enable cow (b) to leave. As cow (b) leaves, the divider 12 between cow (b) and (c) would therefore be able to lift and therefore this would allow cow (c) to leave. This would naturally proceed through the set. As can be seen, this means that the cows will leave the milking shed in single file. Again, this results in far less bullying, jostling and the like and therefore the cows are far more contented.

The end gates 32 are normally manufactured as a rectangular construction, of tubular metal or the like. They may be planar as long as they have slight overlapping relationship to prevent jamming as the dividers 12 were lowered, or pivotally attached to the dividers 12, and are movable from a transverse position to a position approximately parallel with the dividers 12.

The construction shown in FIGS. 5 and 6 varies slightly from that of FIGS. 1 through to 4. However, there is still provided a feeding trough 116 and a brisket rail 118. The dividers 112 are basically the same and the mechanism is mounted to the wall 110. The end gates 132 operate in a very similar manner but they are of slightly different construction. As is dear from FIG. 5, rather than being a rectangular construction, they are of rectangular construction (as is similar to FIGS. 1 to 4) with an additional projecting member 136 projecting sidewardly and slightly rearwardly therefrom. This may be required in certain instances so that the gate 132 will more closely follow the flank of a cow proceeding into a milking stall to make sure that the end gates 132 fully swing to the approximately co-planar position and to thus allow a cow to more easily enter the adjacent stall. In this regard it is to be noted that the gates 132 are not co-planar as is dear from FIG. 5. In addition, the stops 134 are of slightly different construction, as is clear from FIG. 5. This is to ensure that the gates 132 do not swing past the transverse position as shown in FIGS. 5 and 6 to prevent one gate 132 jamming on top of an adjacent gate 132 as the dividers 112 are lowered. Also, it is to be noted that there is now significant overlap between the gates 132 as is dear from FIG. 6.

Test results have shown that after a few uses of a milking shed in which this mechanism is used, even the most unruly herd of cows will enter and leave the milking stalls in a very controlled manner with very little jostling or bullying, and with minimal or no excreta left on the floor of the milking shed.

If desired, there may be incorporated a cover 40 for the feeding trough 16. The purpose of the cover 40 is to cover the feeding trough 16 while the cows are entering and/or leaving the milking shed. The covers 40, like the dividers 12 of FIGS. 1 to 4, may be controlled in batches or as individual segments for each animal. As a further alternative, the cover 40 may be operated in a single entity. The cover 40 would be movable between a first position (see FIG. 2) wherein it covers the feeding trough 16 and a second position where the cows could gain easy access to feed placed in the trough 16. The cover 40 should be in the first position covering the trough 16 when the cows are entering the milking shed so that they will not be tempted to stop early to try and feed on any remnants of feed in the feed trough 16. Only when in position, be it for an individual cow or for a batch of cows or for all of them, would the trough cover 40 be raised and access to the feed in the trough 16 be allowed. The cover 40 would be again raised to the first position when milking had concluded so that the cows would no longer try and feed on any remnants and would also cause the later cows leaving to not hesitate to try and remove remnants of feed left by other cows. This provides for far more orderly entry and exit from the milking shed.

The cover 40 may be linked with the dividers 12 and thus operate with them. In other words, the cover would be moved from the first to the second position as the dividers are lowered. As the dividers 12 are raised at the end of the milking, the cover would be moved back to the first position. As an alternative, the cover 40 may be operated manually or totally independently.

Furthermore, each divider 12,112 may have a locking mechanism so that, when lowered, the lock under the brisket rail 18,118. In this way a cow cannot place her head under a divider 12,112 and force it upwards.

Whilst there has been described in the foregoing description a preferred construction of a milking shed incorporating certain features of the present invention, it will be understood by those skilled in the technology concerned that many variations or modifications and details of design or construction may be made without departing from the essential features of the present invention.

We claim:

1. A mechanism for the control of cows within a milking shed, said mechanism including a plurality of dividers mounted so as to be movable from a first or raised position whereupon cows can move beneath said dividers, to a second or lower position where said dividers are capable of preventing movement by said cows; said dividers being spaced apart so as to provide a plurality of milking stalls for said cows; each of said dividers having an outer end, an inner end, an upper rail, a lower rail, and a plurality of vertical rails connecting said upper rail to said lower rail; each outer end having pivotally mounted thereto an end gate pivotable between a transverse position and a position approximately co-planar with said dividers by movement of a cow into said stall immediately past said divider; and wherein each divider is pivotally mounted to a wall of the milking shed, said lower rail being inclined upwardly at the inner end of each said divider and joining said upper rail at the wall pivotal mounting.

2. A mechanism as claimed in claim 1, wherein there is provided at least one vacuum ram having a rod pivotally attached to said upper rail so as to move said plurality of dividers between said first and second positions.

3. A mechanism as claimed in claim 2, wherein said dividers are arranged in sets, with a set of dividers being operated by one vacuum ram.

4. A mechanism as claimed in claim 2, wherein there is provided a vacuum ram for each of said dividers.

5. A mechanism as claimed in claim 1, wherein said outer end has a stop to prevent said end gate pivoting past said transverse position.

6. A mechanism as claimed in claim 1, wherein said end gates overlap when in said transverse position.

7. A mechanism as claimed in claim 1, wherein said end gates are substantially rectangular and are pivotally attached to said outer ends at approximately their centers.

8. A mechanism as claimed in claim 1, wherein each said end gate has an offset projection extending therefrom so as to rest behind an adjacent end gate.

9. A mechanism as claimed in claim 1, wherein each said divider has attached thereto adjacent the wall pivotal mounting a cover so as to cover at least the majority of a feed through.

* * * * *